US011926153B2

(12) United States Patent
Maeda

(10) Patent No.: US 11,926,153 B2
(45) Date of Patent: Mar. 12, 2024

(54) DROPLET DISCHARGE APPARATUS

(71) Applicant: Takatsugu Maeda, Kanagawa (JP)

(72) Inventor: Takatsugu Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 17/503,862

(22) Filed: Oct. 18, 2021

(65) Prior Publication Data

US 2022/0126570 A1 Apr. 28, 2022

(30) Foreign Application Priority Data

Oct. 26, 2020 (JP) ................................. 2020-178802

(51) Int. Cl.
*B41J 29/38* (2006.01)
*B41J 2/045* (2006.01)

(52) U.S. Cl.
CPC ....... *B41J 2/04508* (2013.01); *B41J 2/04586* (2013.01); *B41J 2/04588* (2013.01)

(58) Field of Classification Search
CPC . B41J 2/04508; B41J 2/04586; B41J 2/04588
See application file for complete search history.

(56) References Cited

U.S. PATENT DOCUMENTS

| | | | |
|---|---|---|---|
| 2017/0165962 A1 | 6/2017 | Mizutani et al. | |
| 2021/0060937 A1 | 3/2021 | Mizutani et al. | |

FOREIGN PATENT DOCUMENTS

| | | | |
|---|---|---|---|
| JP | 2001129978 | * | 5/2001 |
| JP | 2017-170652 | | 9/2017 |
| JP | 2017-222140 | | 12/2017 |

* cited by examiner

*Primary Examiner* — Lam S Nguyen
(74) *Attorney, Agent, or Firm* — Duft & Bornsen, PC

(57) ABSTRACT

A droplet discharge apparatus includes a discharge device, a plurality of waveform generation units, a plurality of correction units, and a drive unit. The discharge device discharges droplets of a plurality of droplet types according to a plurality of drive waveforms. The plurality of waveform generation units individually generate drive waveforms used to discharge each of the plurality of droplet types. The plurality of correction units individually correct the drive waveforms generated by each of the plurality of waveform generation units, using correction magnifications different corresponding to the drive waveforms generated by the plurality of waveform generation units, to generate correction waveforms. The drive unit causes the discharge device to discharge the droplets according to corrected drive waveforms generated by individually switching the drive waveform corresponding to the plurality of droplet types to the correction waveforms.

7 Claims, 11 Drawing Sheets

DROPLET DISCHARGE APPARATUS

CROSS-REFERENCE TO RELATED APPLICATION

This patent application is based on and claims priority pursuant to 35 U.S.C. § 119(a) to Japanese Patent Application No. 2020-178802, filed on Oct. 26, 2020, in the Japan Patent Office, the entire disclosure of which is hereby incorporated by reference herein.

TECHNICAL FIELD

Embodiments of the present disclosure relate to a droplet discharge apparatus.

RELATED ART

In a droplet discharge apparatus including a plurality of nozzles, there is known a technology of using a drive waveform signal to control the speed of discharging droplets.

In order for the droplet discharge apparatus to correct, for example, the discharge amount or the discharge speed against the influence of crosstalk and the like, the droplet discharge apparatus is provided with a correction magnification table defining correction magnifications. The droplet discharge apparatus corrects the drive waveform signal output to a recording head based on the correction magnification table. In this manner, the droplet discharge apparatus restrains fluctuations in discharge amount and discharge speed caused by such crosstalk (electrical interference due to the drive current between paths).

SUMMARY

In an embodiment of the present disclosure, there is provided a droplet discharge apparatus that includes a discharge device, a plurality of waveform generation units, a plurality of correction units, and a drive unit. The discharge device discharges droplets of a plurality of droplet types according to a plurality of drive waveforms. The plurality of waveform generation units individually generate drive waveforms used to discharge each of the plurality of droplet types. The plurality of correction units individually correct the drive waveforms generated by each of the plurality of waveform generation units, using correction magnifications different corresponding to the drive waveforms generated by the plurality of waveform generation units, to generate correction waveforms. The drive unit causes the discharge device to discharge the droplets according to corrected drive waveforms generated by individually switching the drive waveform corresponding to the plurality of droplet types to the correction waveforms.

In another embodiment of the present disclosure, there is provided a droplet discharge apparatus that includes a discharge device, a first waveform generation unit, a second waveform generation unit, a first correction unit, a second correction unit, and a drive unit. The discharge device discharges droplets of a plurality of droplet types. The first waveform generation unit generates a first waveform to discharge a first droplet type of the plurality of droplet types. The second waveform generation unit generates a second waveform to discharge a second droplet type of the plurality of droplet types. The first correction unit corrects the first waveform at a first correction magnification to generate a first correction waveform. The second correction unit corrects the second waveform at a second correction magnification to generate a second correction waveform. The drive unit causes the discharge device to discharge the droplets according to corrected drive waveforms obtained as a result of switching the first correction waveform and the second correction waveform.

In still another embodiment of the present disclosure, there is provided a droplet discharge apparatus that includes a discharge device, a first circuit, a second circuit, and a third circuit. The discharge device discharges droplets of a plurality of droplet types. The first circuit generates a first waveform to discharge a first droplet type of the plurality of droplet types and corrects the first waveform at a first correction magnification to generate a first correction waveform. The second circuit generates a second waveform to discharge a second droplet type of the plurality of droplet types and corrects the second waveform at a second correction magnification to generate a second correction waveform. The third circuit causes the discharge device to discharge the droplets according to corrected drive waveforms obtained as a result of switching the first correction waveform and the second correction waveform.

BRIEF DESCRIPTIONS OF THE DRAWINGS

A more complete appreciation of the disclosure and many of the attendant advantages and features thereof can be readily obtained and understood from the following detailed description with reference to the accompanying drawings, wherein.

Figure 1:
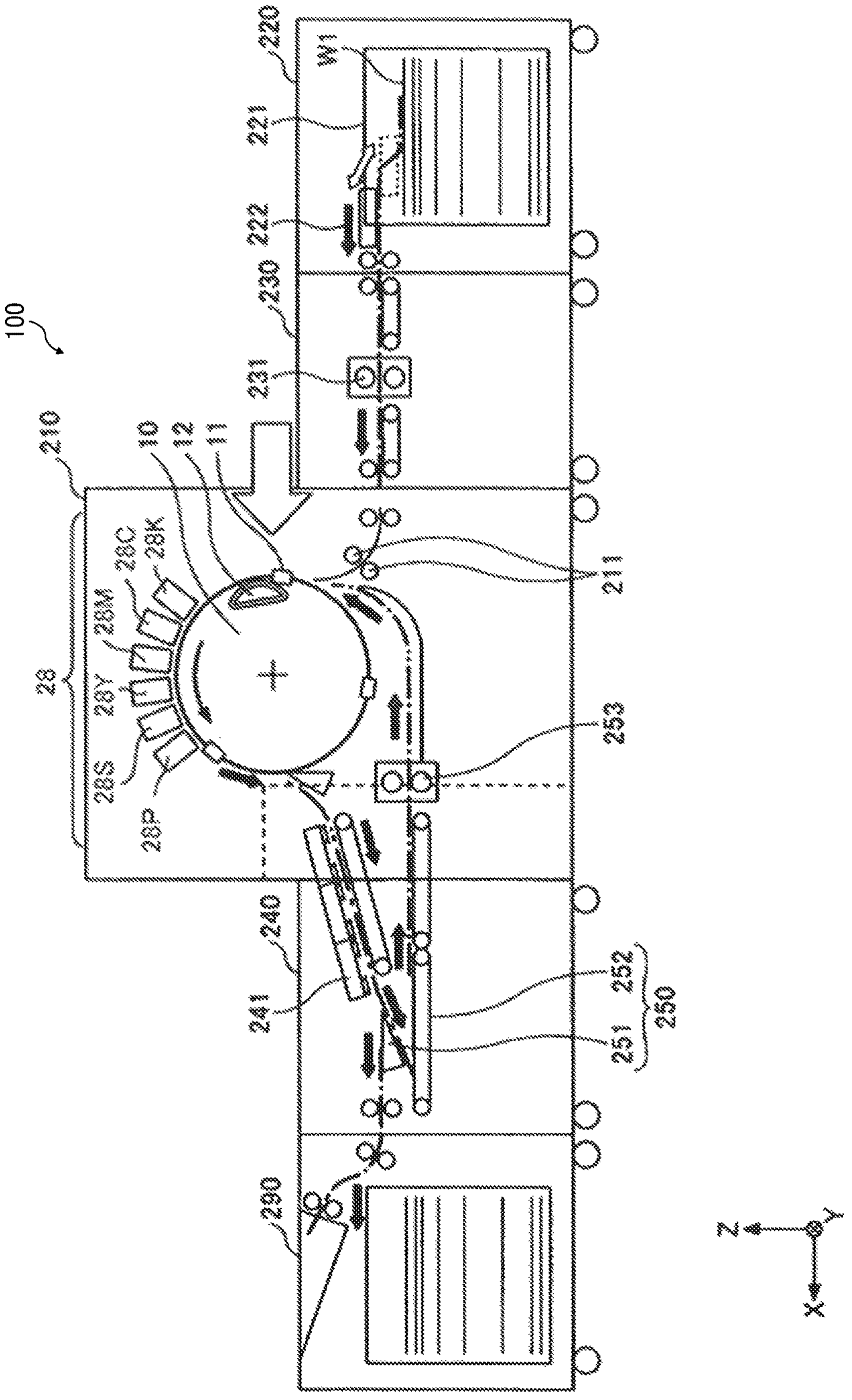
FIG. 1 is a diagram illustrating an entire configuration of a droplet discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTIONS OF EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, specific examples are described with reference to the accompanying drawings. Embodiments of the present disclosure are not limited to the specific examples described below.

Entire Configuration Example of Droplet Discharge Apparatus

FIG. 1 is a diagram illustrating an entire configuration of a droplet discharge apparatus according to an embodiment of the present disclosure. The droplet discharge apparatus according to the present embodiment is an image forming system 100 as follows. The image forming system 100 includes, for example, an image forming device 210, a sheet feeding device 220, a registration adjusting device 230, a drying device 240, a recording medium reversing device 250, and a sheet ejecting device 290.

For example, when printing is performed, in the sheet feeding device 220, a plurality of recording media W1 is loaded in advance in a sheet stack 221. In such a state, when the printing is started, an air separating device 222 picks up the recording medium W1 one by one.

The recording medium W1 is conveyed in a direction toward the image forming device 210 (a direction indicated by an arrow in FIG. 1, in other words, a leftward direction in FIG. 1). In this manner, the recording medium W1 is conveyed to the registration adjusting device 230.

The registration adjusting device 230 includes a registration roller pair 231 in the same. The registration roller pair 231 corrects, for example, the inclination of the recording medium W1. After the correction, the recording medium W1 is conveyed to the image forming device 210.

The image forming device 210 includes, for example, a drum 10 and a recording medium gripper 11. For example, the drum 10 has a cylindrical shape. The recording medium gripper 11 is installed on a surface of the drum 10.

When the recording medium W1 is conveyed from the registration adjusting device 230, the recording medium gripper 11 grips the leading end of the recording medium W1. Thereafter, when the drum 10 rotates, the recording medium W1 is conveyed to head modules 28.

The head modules 28 are for different colors, for example. Hereinafter, the head module 28 for black is referred to as "head module 28K".

The head module 28 for cyan is referred to as "head module 28C".

Similarly, the head module 28 for magenta is referred to as "head module 28M".

The head module 28 for yellow is referred to as "head module 28Y".

There may also be a "head module 28S" for special color, a "head module 28P" for pink and the like.

In the following description, an arbitrary head module out of the head modules 28 is simply referred to as the "head module 28".

The head module 28 as a discharge device discharges droplets to the recording medium W1 by an inkjet method. In order to discharge the droplets in this manner, the head module 28 includes a recording head unit and the like. The head module 28 is filled with ink of a predetermined color.

For example, the head modules 28K to 28P are arranged radially at an angle. With such arrangement, the recording medium gripper 11 grips the recording medium W1 and the drum 10 rotates, so that the image forming device 210 conveys the recording medium W1 to a position facing the head modules 28K to 28P. After such conveyance, the head modules 28K to 28P discharge ink to the recording medium W1. Such discharge forms an image on the recording medium W1.

The drum 10 includes an idle discharge receiver 12 on an outer peripheral surface. The idle discharge receiver 12 receives ink in a case where the discharge is not performed on the recording medium W1 and the like. That is, the idle discharge receiver 12 receives so-called idle discharge ink.

After the image is formed by the image forming device 210, the recording medium W1 is conveyed to the drying device 240.

The drying device 240 includes a drying unit 241 and the like.

The drying unit 241 evaporates moisture of the recording medium W1. In the illustrated configuration, the drying unit 241 dries the recording medium W1 passing below the same.

The drying device 240 further includes the recording medium reversing device 250 including a recording medium reversing mechanism 251. The recording medium reversing device 250 further includes a reverse conveying device 252.

In a case of duplex printing, the recording medium reversing mechanism 251 first reverses the recording medium W1. After the reversal, the reverse conveying device 252 conveys the recording medium W1 in a direction toward the image forming device 210. In a case of the duplex printing, a registration roller 253 corrects the inclination of the recording medium W1.

When drying by the drying device 240 is completed, the recording medium W1 is conveyed to the sheet ejecting device 290. The recording medium W1 is loaded on the sheet ejecting device 290.

In a case of discharging droplets of ink and the like by the inkjet method, for example, an inkjet recording head module having a configuration as follows is used.

Figure 2:
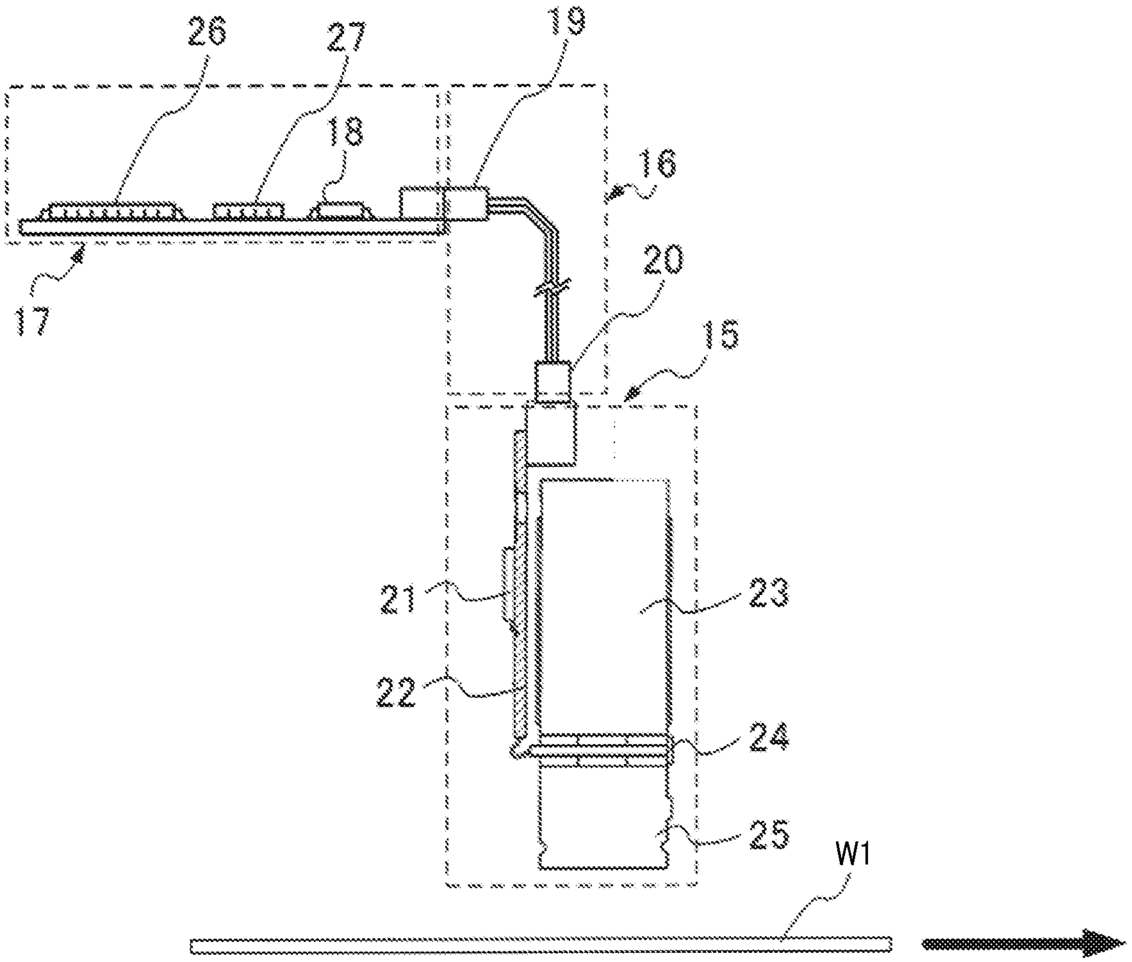
FIG. 2 is a diagram illustrating an inkjet recording head module according to an embodiment of the present disclosure.

FIG. 2 is a diagram illustrating an example of the inkjet recording head module. Hereinafter, a case where the recording medium W1 is conveyed in a direction indicated by an arrow (a rightward direction in the illustrated example) is described as an example.

The inkjet recording head module includes, for example, a drive control board 17, a recording head 15, and a cable 16.

The drive control board 17 includes, for example, a drive control device 26, a drive waveform generating device 27, and a storage device 18.

The cable 16 includes, for example, a drive control board connector 19 and a head-side connector 20 on both ends. The cable 16 electrically connects the drive control board 17 and the head board 22. In this manner, the cable 16 performs communication by analog signals and digital signals between the drive control board 17 and the head board 22.

The recording head 15 includes, for example, a residual vibration detecting module 21, the head board 22, a head driving integrated circuit (IC) board 24, an in-head ink tank 23, a rigid plate 25 and the like. For example, a line scanning type inkjet recording device has a line head configuration in which a plurality of recording heads 15 is arranged in the depth direction or the direction toward the front side in FIG. 1 (that is, a direction orthogonal to the conveyance direction).

The line head configuration may also be a serial scanning type and the like. Specifically, the serial scanning type inkjet recording device includes one or a plurality of recording heads 15, and conveys the recording medium W1 to form an image while moving the recording head 15 in the depth direction or the direction toward the near side.

For example, the droplet discharge apparatus is as described above. Note that, the droplet discharge apparatus may also be a printer and the like having a hardware configuration other than the above.

Configuration Example of Circuit

Figure 3:
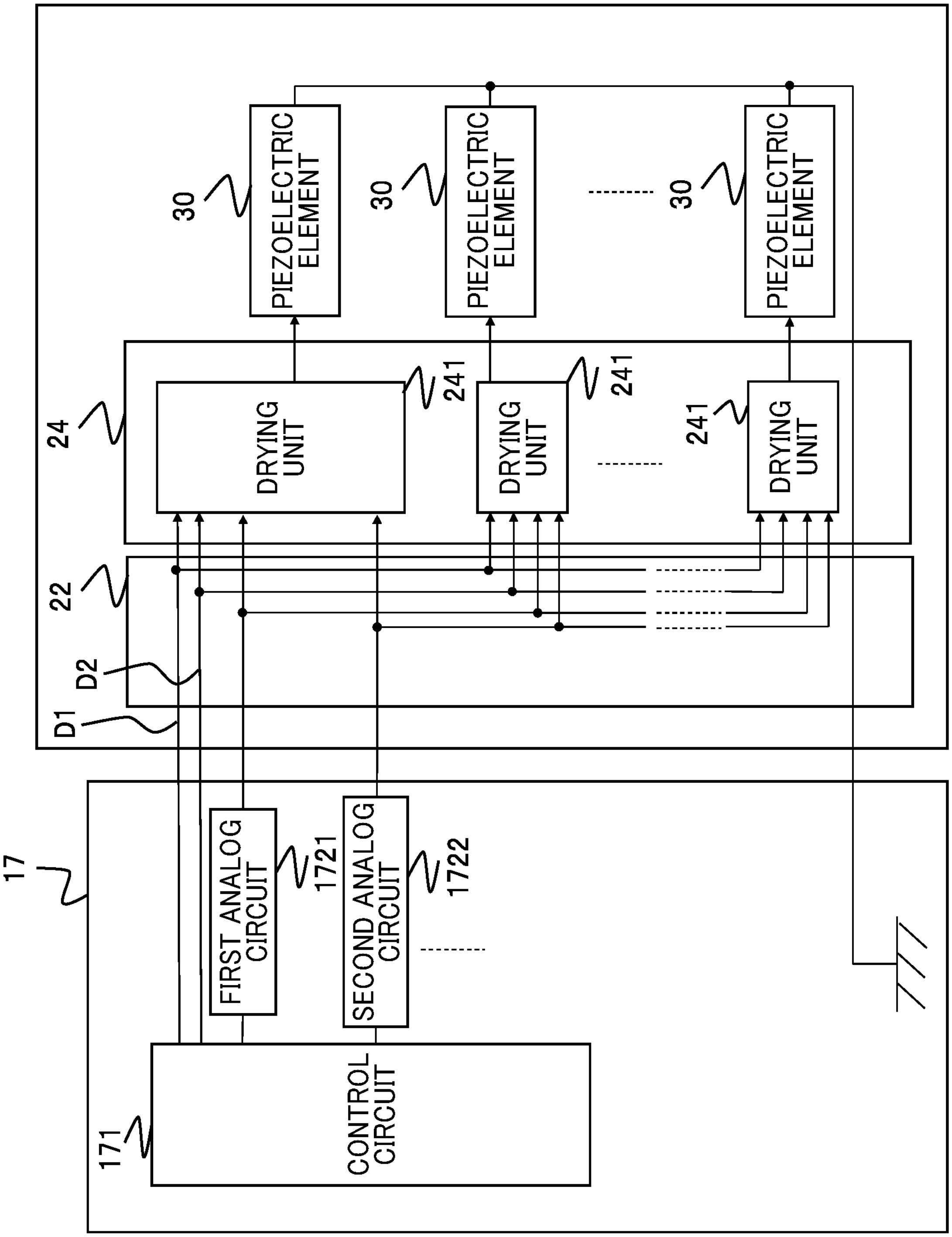
FIG. 3 is a diagram illustrating a configuration of circuits according to an embodiment of the present disclosure.

FIG. 3 is a diagram illustrating a configuration example of circuits. For example, the drive control board 17, and the head board 22, and the head driving IC board 24 of the inkjet recording head module have circuit configurations as follows.

The drive control board 17 includes a control circuit 171, a plurality of analog circuits, and the like. Hereinafter, an example in which there are two analog circuits of a "first analog circuit 1721" and a "second analog circuit 1722" is described. The number of analog circuits is not limited to two and may be two or larger according to the number of droplet types to be used and the like. Hereinafter, the first analog circuit 1721 is an analog circuit for a "first droplet type X". In contrast, the second analog circuit 1722 is an analog circuit for a "second droplet type Y".

The head driving IC board 24 includes a plurality of switching circuits 242. For example, the switching circuit 242 outputs a drive waveform to a piezoelectric element 30 to control the piezoelectric element 30.

The head driving IC board 24 includes the switching circuit 242 separately for each piezoelectric element 30. Therefore, in a case where "N" piezoelectric elements 30 are to be controlled, the circuit configuration includes "N" switching circuits 242.

The control circuit 171 transmits image data D1, timing data D2, and the like to the switching circuit 242.

The image data D1 indicates an image and the like formed on a recording medium in image formation. For example, the droplet type used for the image formation is determined by the image data D1 and the like.

The timing data D2 indicates a timing of discharging a droplet and the like. There may also be mask data indicating selection of ON and OFF for an analog switch.

For example, a case of handling two droplet types of the first droplet type X and the second droplet type Y is described as an example.

In the circuit configuration illustrated in FIG. 3, the drive control board 17 first generates a waveform for driving the piezoelectric element 30 by the analog circuit. Hereinafter, the waveform generated by the first analog circuit 1721 is referred to as a "first waveform". Similarly, the waveform generated by the second analog circuit 1722 is referred to as a "second waveform". In this example, the first waveform and the second waveform are waveforms before correction.

The inkjet recording head module outputs the analog signal to the piezoelectric element 30 by the switching circuit 242. The piezoelectric element 30 is displaced according to a voltage indicated by the analog signal.

Hereinafter, an example in which the first analog circuit 1721 and the second analog circuit 1722 generate a first waveform WV1 and a second waveform WV2 as follows, respectively, is described. In the example described below, the first analog circuit 1721 and the second analog circuit 1722 correct the waveforms and generate correction waveforms.

In the following example, when a signal indicating the correction waveform (a "VCOM" signal and the like transmits the correction waveform) is transmitted to the switching circuit 242, the switching circuit 242 switches a plurality of correction waveforms to generate a drive waveform.

That is, the switching circuit 242 outputs the analog signal to the piezoelectric element 30 based on the drive waveform determined by a switching result. The correction may be performed by a circuit other than the analog circuit.

Figure 4:
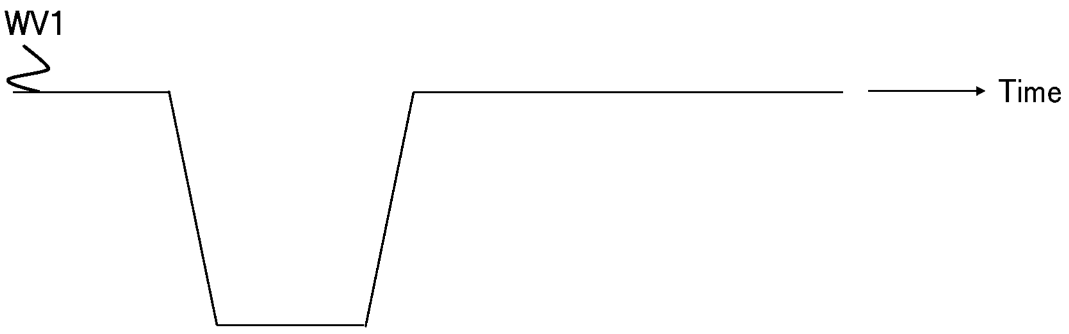
FIG. 4 is a graph illustrating an example of a first waveform.

FIG. 4 is a graph illustrating an example of the first waveform WV1. For example, the first waveform WV1 serving as a base of the drive waveform for the first droplet type X is as illustrated in the graph.

Figure 5:
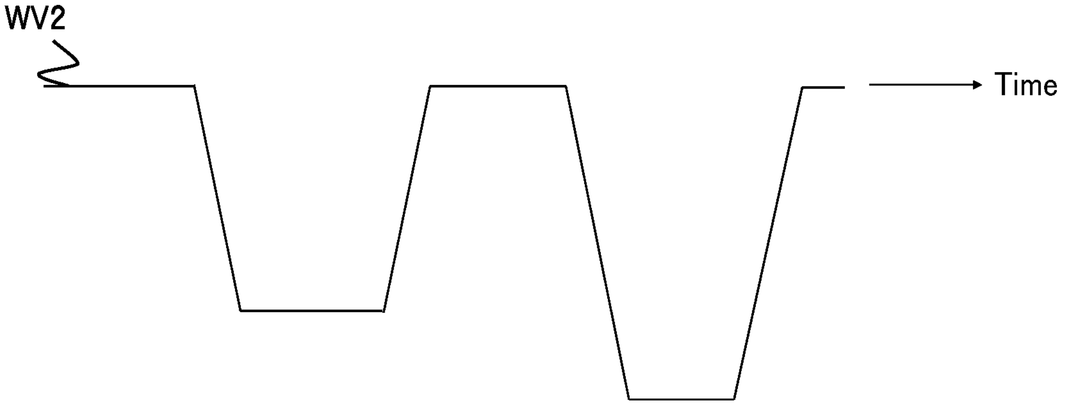
FIG. 5 is a graph illustrating an example of a second waveform.

FIG. 5 is a graph illustrating an example of the second waveform WV2. For example, the second waveform WV2 serving as a base of the drive waveform for the second droplet type Y is as illustrated in the graph.

In the configuration in which the first waveform WV1 and the second waveform WV2 are separately generated in this manner, different corrections may be independently performed on the first waveform WV1 and the second waveform WV2. Specifically, the correction as follows may be performed.

Figure 6:
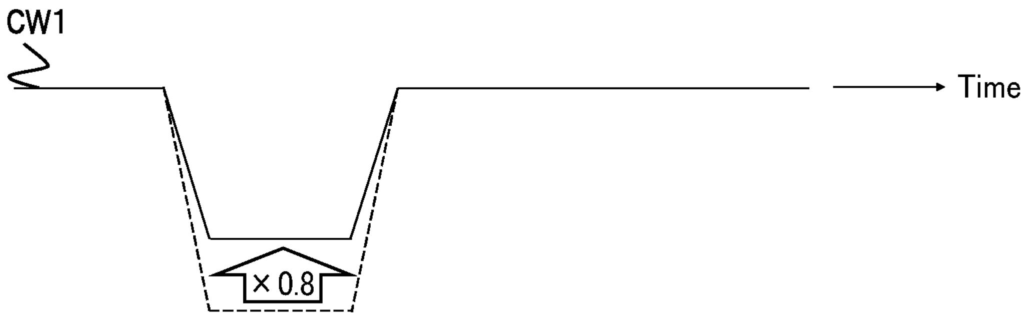
FIG. 6 is a graph illustrating an example of a first correction waveform.

FIG. 6 is a graph illustrating an example of a first correction waveform CW1.

The first correction waveform CW1 is generated by correction of the first waveform WV1. Specifically, the first correction waveform CW1 is generated by correction of multiplying the first waveform WV1 by "0.8" that is an example of correction magnification (hereinafter, the correction magnification for the first waveform WV1 is referred to as "first correction magnification"). In the graph, the first waveform WV1, that is, the first waveform WV1 before the correction is indicated by a broken line.

Figure 7:
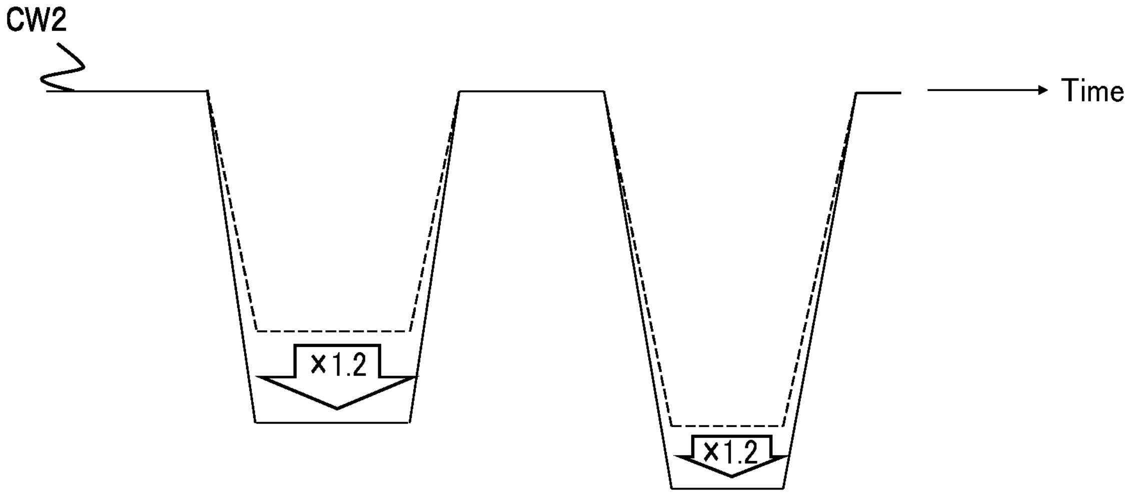
FIG. 7 is a graph illustrating an example of a second correction waveform.

FIG. 7 is a graph illustrating an example of the second correction waveform CW2.

The second correction waveform CW2 is generated by correction of the second waveform WV2. Specifically, the second correction waveform CW2 is generated by correction of multiplying the second waveform WV2 by "1.2" that is an example of correction magnification (hereinafter, the correction magnification for the second waveform WV2 is referred to as "second correction magnification"). In the graph, the second waveform WV2, that is, the second waveform WV2 before the correction is indicated by a broken line.

In the above-described example, since the first correction waveform CW1 has the first correction magnification of a value equal to or smaller than "1" such as "0.8", this is generated by the correction of reducing amplitude of the waveform from the first waveform WV1. In contrast, since the second correction waveform CW2 has the second correction magnification of a value equal to or larger than "1" such as "1.2", this is generated by the correction of increasing amplitude of the waveform from the second waveform WV2.

As described above, in the configuration including a plurality of analog circuits, the first correction magnification and the second correction magnification may be set to different values, and individual correction may be performed. When such correction may be performed, for example, speed adjustment as follows and the like may be performed.

Figure 8:
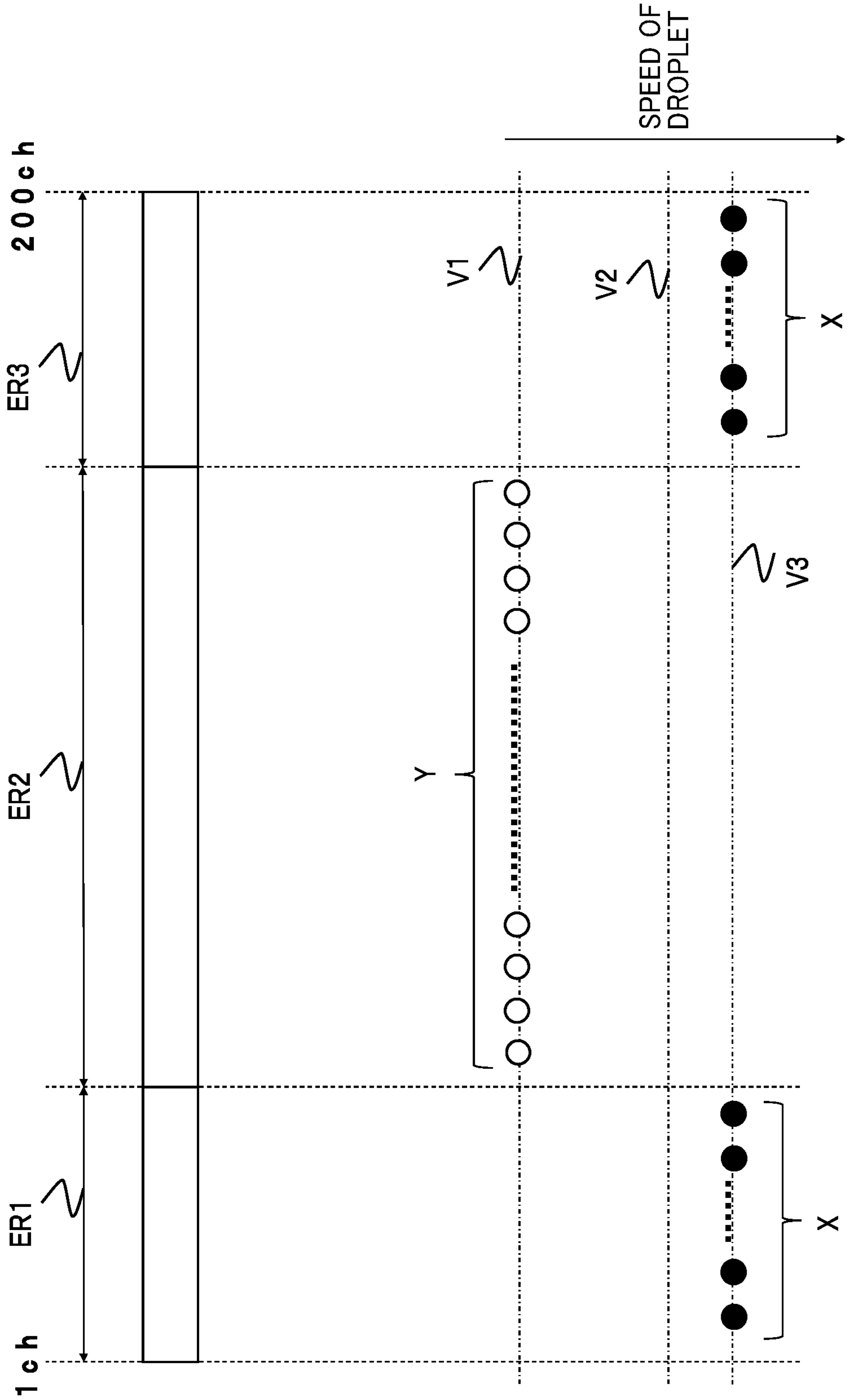
FIG. 8 is a graph illustrating an example of adjustment of the droplet speed.

FIG. 8 is a graph illustrating an example of adjustment of the droplet speed. Hereinafter, a case of an inkjet head including nozzle holes of "1ch" to "200ch" is described as an example in the graph. In the example described below, it is set such that the nozzle holes of 200ch are divided into three areas of a first area ER1, a second area ER2, and a third area ER3.

For example, the first area ER1 and the third area ER3 are discharge areas in which the first droplet type X is used. In contrast, the second area ER2 is a discharge area in which the second droplet type Y is used. As described above, a plurality of droplet types may be used in a mixed manner.

The droplet speed is plotted along the ordinate in the graph. Along the ordinate, the droplet speed plotted in a lower portion is higher. Specifically, an example in which the speed of the second droplet type Y is a first speed V1 is illustrated. In contrast, an example in which the speed of the first droplet type X is a third speed V3 is illustrated. In the following description, the target speed is a second speed V2. Therefore, in this example, the speed of the second droplet type Y is lower than the second speed V2. In contrast, the speed of the first droplet type X is higher than the second speed V2.

In this manner, the droplet speed may be different from the target speed due to the influence of crosstalk and the like. Therefore, it is desirable that the droplet speed may be adjusted by correction. In the example illustrated in FIG. 8, the second droplet type Y is subjected to correction to increase the speed in order to approach the second speed V2. In contrast, the first droplet type X is subjected to correction to decrease the speed in order to approach the second speed V2. As described above, the droplet speed may be adjusted to the target speed by the correction.

The drive waveform and the droplet speed are in a relationship as follows, for example.

Figure 9:
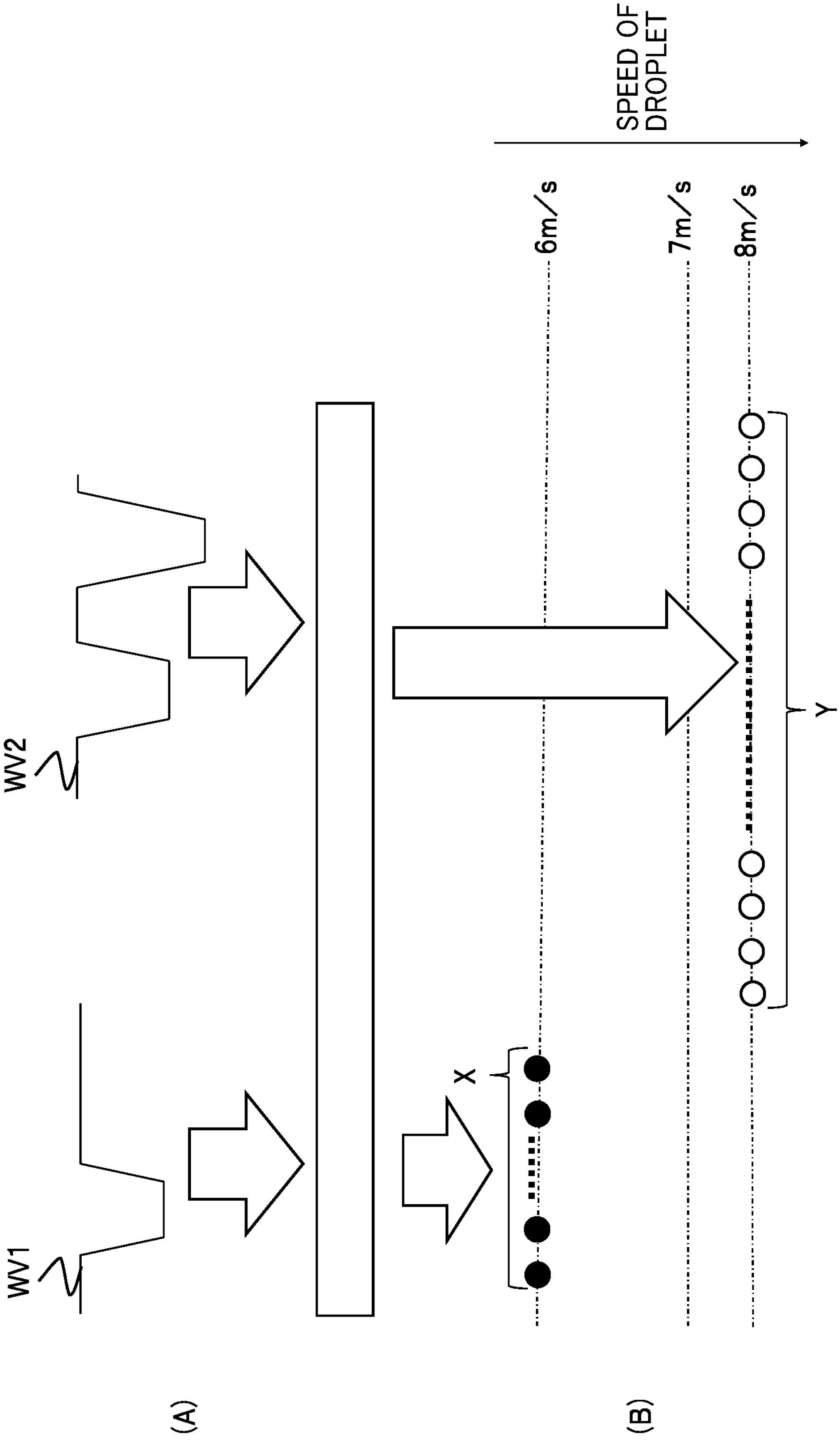
FIG. 9 is a diagram illustrating an example of the relationship between drive waveform and the droplet speed.

FIG. 9 is a diagram illustrating an example of the relationship between the drive waveform and the droplet speed. Hereinafter, part (A) of FIG. 9, which is an upper graph, illustrates the drive waveform to be used. In contrast, part (B) of FIG. 9, which is a lower graph, illustrates the droplet speed discharged based on the drive waveform. In part (B) of FIG. 9, as in FIG. 8, the droplet speed is plotted along the ordinate.

For example, when the first waveform WV1 is used, the speed of the first droplet type X is "6 m/s".

In contrast, when the second waveform WV2 is used, the speed of the second droplet type Y is "8 m/s".

In a case where the target speed is "7 m/s", the correction is performed at correction magnification set as follows.

Figure 10:
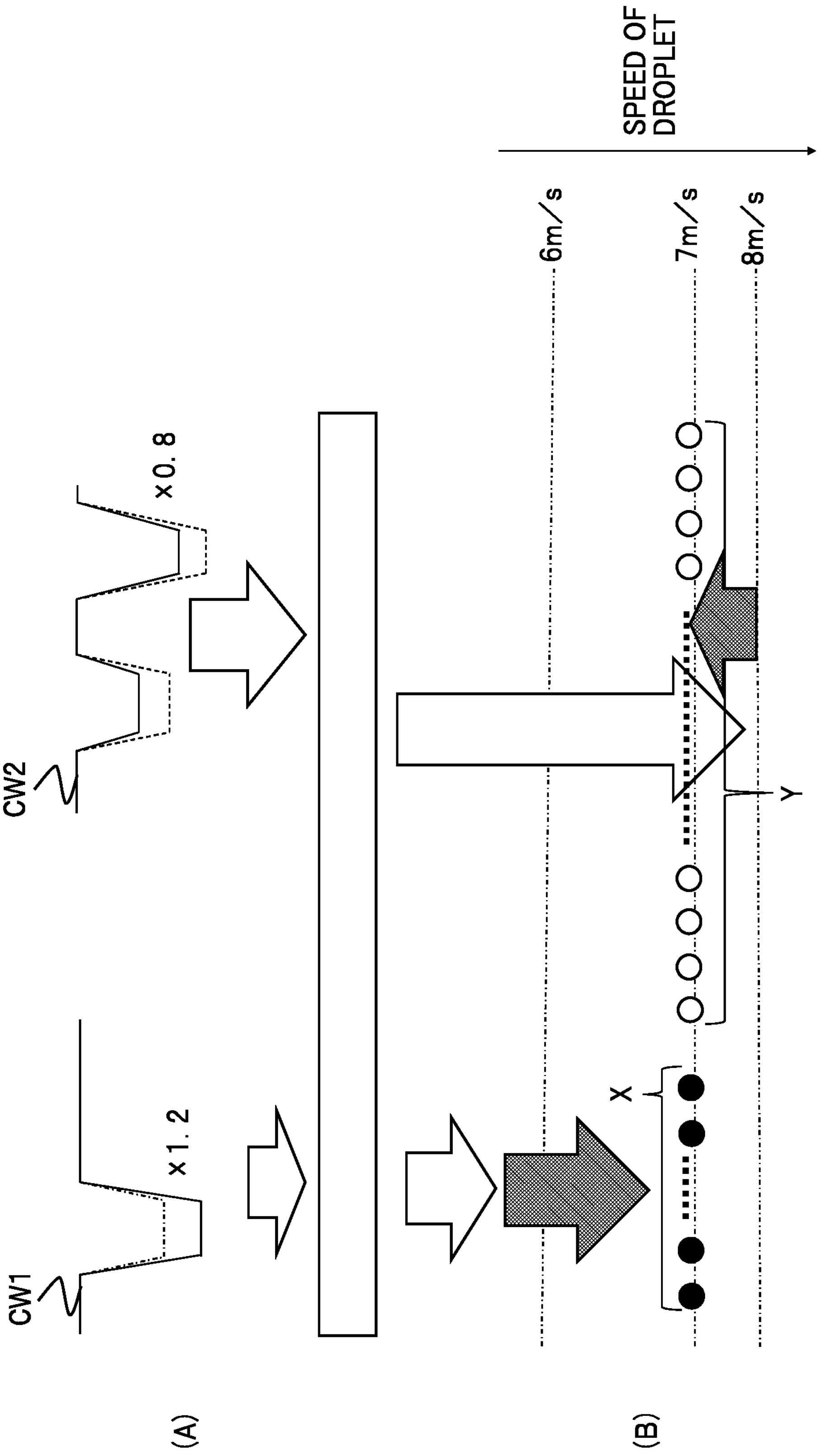
FIG. 10 is a diagram illustrating an example of adjustment of the droplet speed by correction.

FIG. 10 is a diagram illustrating an example of adjustment of the droplet speed by the correction. In part (A) of FIG. 10, the waveform before the correction is indicated by a broken line as reference, and the waveform after the correction is indicated by a solid line. For example, the correction is to multiply the first waveform WV1 in part (A) of FIG. 9 by the first correction magnification of "1.2" to increase voltage amplitude. As a result of this correction, the droplets of the first droplet type X are discharged based on the first correction waveform CW1 illustrated in part (B) of FIG. 10.

In this case, the first correction magnification is "1.2". Therefore, the droplet speed becomes higher by the correction. Therefore, the droplets of the first droplet type X are adjusted to be discharged at a speed closer to target "7 m/s" than to "6 m/s" before the correction.

Specifically, between "6 m/s" before the correction and target "7 m/s", there is a difference in speed of "−1 m/s" from the target speed.

Then, the correction is performed so as to reduce the difference in speed. For example, for the droplets of the first droplet type X, the correction is the adjustment to increase the speed as illustrated in part (B) of FIG. 10.

In contrast, the correction is to multiply the second waveform WV2 in part (A) of FIG. 9 by the second correction magnification of "0.8" to reduce the voltage amplitude. As a result of this correction, the droplets of the second droplet type Y are discharged based on the second correction waveform CW2 illustrated in part (B) of FIG. 10.

In this case, the second correction magnification is "0.8". Therefore, the droplet speed becomes lower by the correction. Therefore, the droplets of the second droplet type Y are adjusted to be discharged at a speed closer to target "7 m/s" than to "8 m/s" before the correction.

Specifically, between "8 m/s" before the correction and target "7 m/s", there is a difference in speed of "+1 m/s" from the target speed.

Then, the correction is performed so as to reduce the difference in speed. For example, for the droplets of the second droplet type Y, the correction is the adjustment to decrease the speed as illustrated in FIG. 10B.

As described above, the droplet discharge apparatus adjusts by the correction of multiplying the correction magnification by the voltage of the drive waveform.

In the above-described example, when the correction magnification is set to a value larger than "1", the droplet speed may be increased. Specifically, as a result of measuring the droplet speed, in a case of correcting the current droplet speed of "6 m/s" to the target speed of "7 m/s", the correction of "+1.0 m/s" of the speed is performed. In such correction, the correction magnification is calculated as "1.0+0.2×(+1.0)=1.2". By such calculation, the first correction magnification is set to "1.2".

In contrast, when the correction magnification is set to a value smaller than "1", the droplet speed may be reduced. Specifically, as a result of measuring the droplet speed, in a case of correcting the current droplet speed of "8 m/s" to the target speed of "7 m/s", the correction of "−1.0 m/s" of the speed is performed. In such correction, the correction magnification is calculated as "1.0+0.2×(−1.0)=0.8". By such calculation, the second correction magnification is set to "0.8".

The above-described calculation is an example of making a value of the correction magnification to "±0.2" for the correction of "±1 m/s" of the droplet speed. Specifically, the correction of "+1 m/s" of the droplet speed is determined by calculation of setting the correction magnification to "+0.2". In contrast, the correction of "−1 m/s" of the droplet speed is determined by calculation of setting the correction magnification to "−0.2".

It is set in advance how to determine the correction magnification to correct the speed according to characteristics such as the nozzle, the droplet, and the type of the recording head. The correction is not limited to the correction to bring the speed close to the target speed, and may be correction to make the speeds of a plurality of droplet types even.

When performing the correction, the droplet discharge apparatus measures the droplet speed for each droplet type. For example, the droplet discharge apparatus desirably has a hardware configuration including a sensor and the like that performs ranging. In such configuration of performing ranging, the droplet speed is measured by calculating a distance traveled by the droplet per unit time. In such configuration of performing ranging, the droplet speed may be correctly measured for each droplet type. Therefore, it is possible to correctly grasp that there is a difference in droplet speed between the droplet types.

The correction is not limited to correction based on the difference in speed measured by the sensor and the like. For example, the correction may be performed based on a position where the discharged droplet lands on the recording medium and the like (hereinafter referred to as a "landing position").

Specifically, the distance between a nozzle surface of the nozzle hole and the recording medium is specified in advance by measurement and the like. That is, the droplet discharge apparatus grasps the distance from the discharge to the landing of the discharged droplet in advance.

After discharging the droplet, the droplet discharge apparatus specifies the landing position. For example, the landing position is specified by sensing the recording medium after the droplet is discharged with the sensor.

The distance from the discharge to the landing of the discharged droplet is substantially constant. In contrast, the droplet speed and the like changes depending on various conditions. Therefore, a point that becomes the landing position at a speed assumed in advance and the like (hereinafter referred to as a "target point") may be calculated in advance to be specified based on the distance from the discharge to the landing of the discharged droplet determined in advance, a target speed and the like.

In contrast, when there is a difference between the target speed and the current speed, the landing position differs from the target point. The correction is performed so as to reduce the difference between the landing position and the target point. That is, the correction is adjustment to bring the landing position as close as the target point.

When the correction is performed based on the landing position in this manner, the droplet may be landed at the target point with accuracy even in a case where the droplet speed is different for each droplet type.

When the difference occurs between the landing position and the target point, the difference affects an image quality in a case where the image indicated by the image data is formed on the recording medium. Therefore, when the droplet may be landed on the target point with accuracy by the correction, the droplet discharge apparatus may form a high-quality image.

In the configuration in which the landing position is specified, it is possible to reduce the difference between the landing position and the target point due to a cause other than the difference in droplet speed.

Comparative Example

Figure 11:
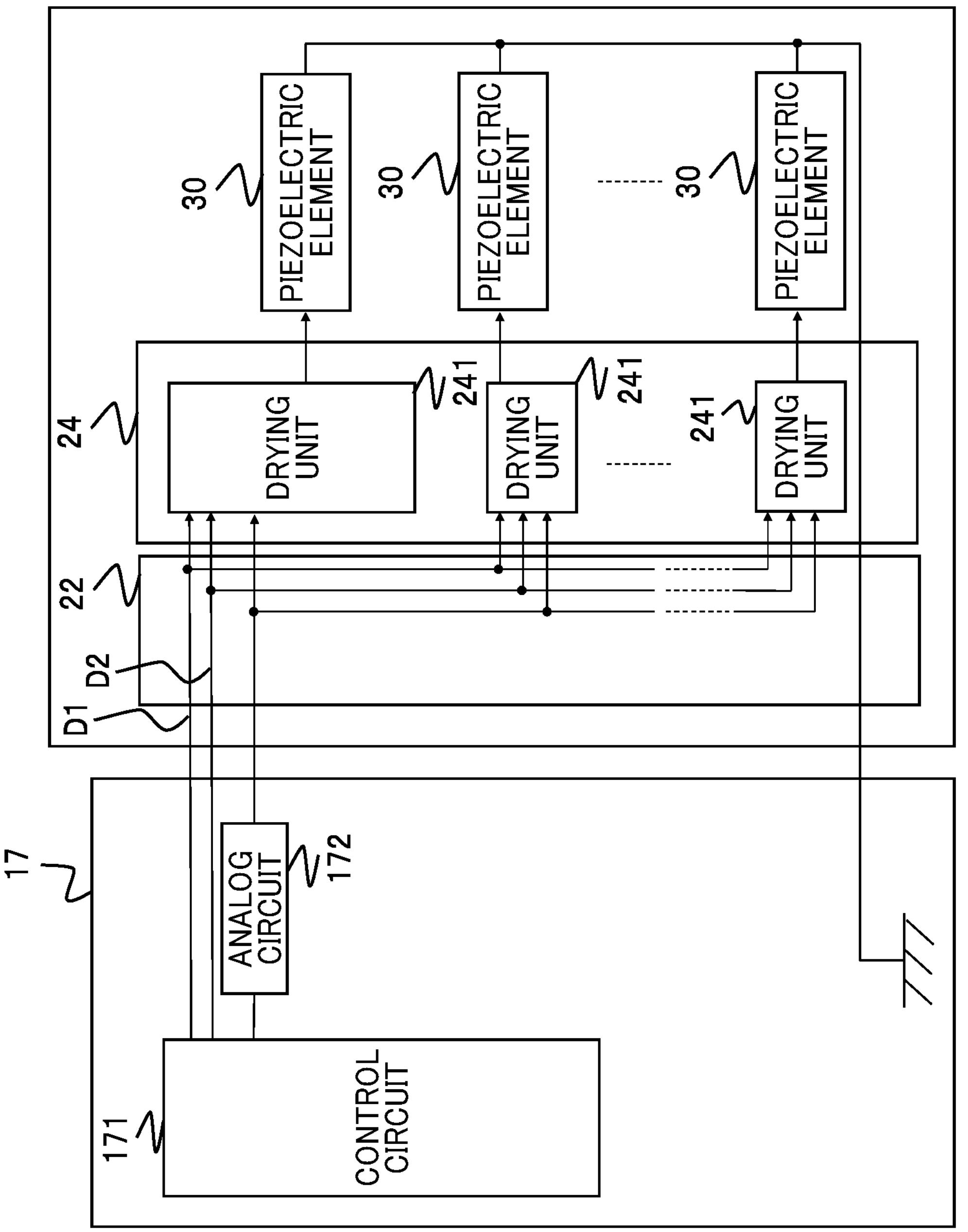
FIG. 11 is a diagram illustrating a configuration of circuits in a comparative example.

FIG. 11 is a diagram illustrating a configuration example of a circuit in a comparative example. The comparative example is different from the configuration of the circuit illustrated in FIG. 3 in that there is one analog circuit 172. In such comparative example, a correction result is as follows, for example.

Figure 12:
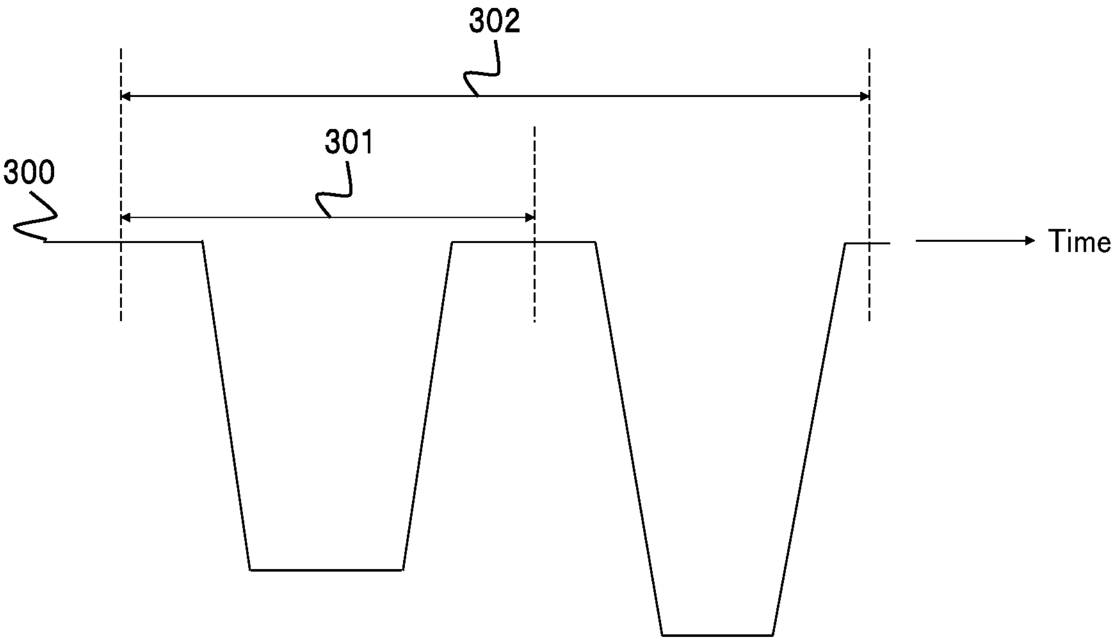
FIG. 12 is a graph illustrating a waveform before correction in the comparative example.

FIG. 12 is a graph illustrating a waveform before correction in the comparative example. In the circuit configuration as illustrated in FIG. 11, in a case where two types of a first droplet type X and a second droplet type Y are used, a waveform as illustrated is commonly used for the two droplet types (hereinafter referred to as a "common waveform 300").

A first portion 301 in the common waveform 300 is for the first droplet type X. A second portion 302 in the common waveform 300 is for the second droplet type Y. In the configuration in which the common waveform 300 is used for a plurality of droplet types in this manner, the correction is performed as follows, for example.

Figure 13:
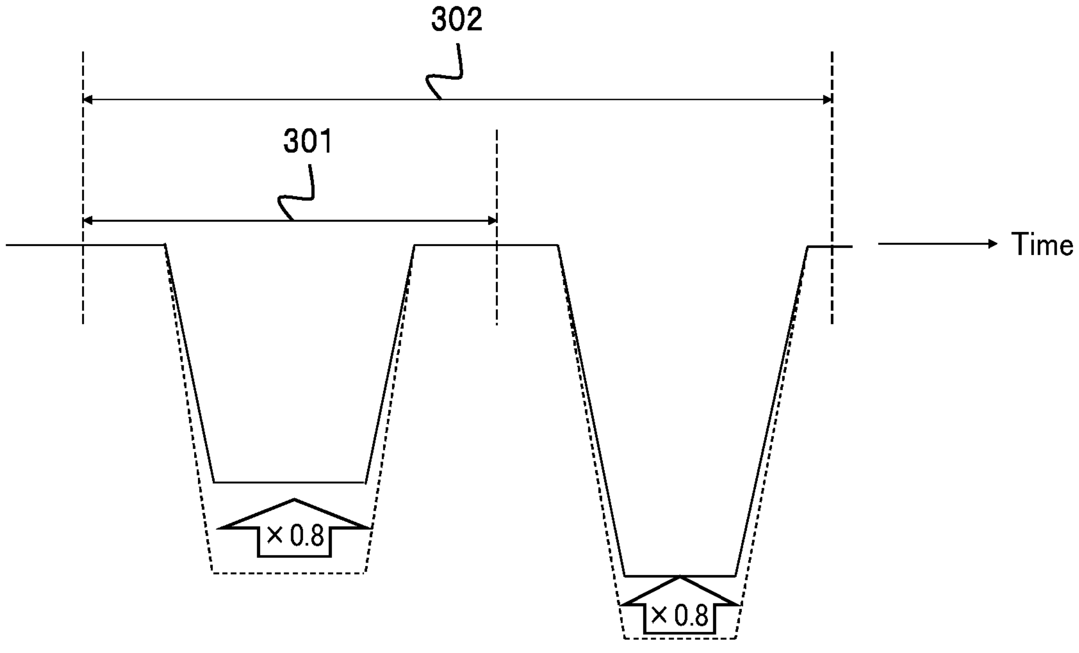
FIG. 13 is a graph illustrating a first correction in the comparative example.

FIG. 13 is a graph illustrating an example of a first correction in the comparative example. For example, the correction is performed so as to multiply a voltage of a drive waveform by "×0.8".

Figure 14:
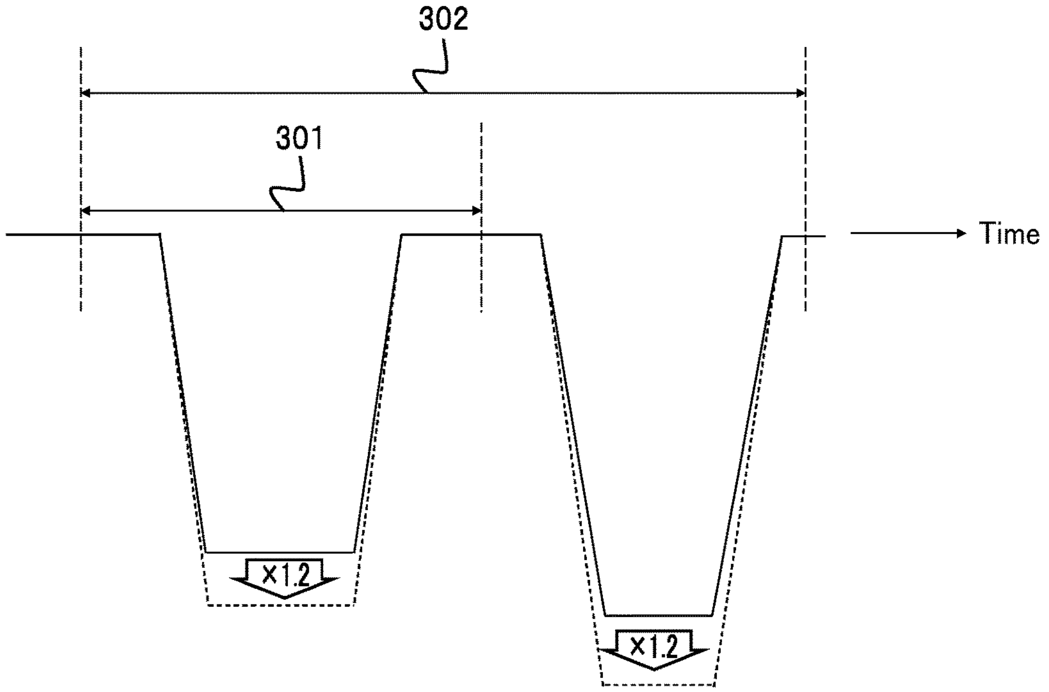
FIG. 14 is a graph illustrating a second correction in the comparative example.

FIG. 14 is a graph illustrating an example of a second correction in the comparative example. For example, the correction is performed so as to multiply a voltage of a drive waveform by "×1.2".

As described above, since the common waveform is used in the comparative example, the correction has common magnification. Therefore, the first portion 301 and the second portion 302 are uniformly multiplied by the same correction magnification. Therefore, it might be difficult to perform different adjustment for each droplet type. Therefore, there is a case where only one of the corrections in FIGS. 13 and 14 may be selected, and it is not possible to individually optimize for each droplet type.

Functional Configuration Example

Figure 15:
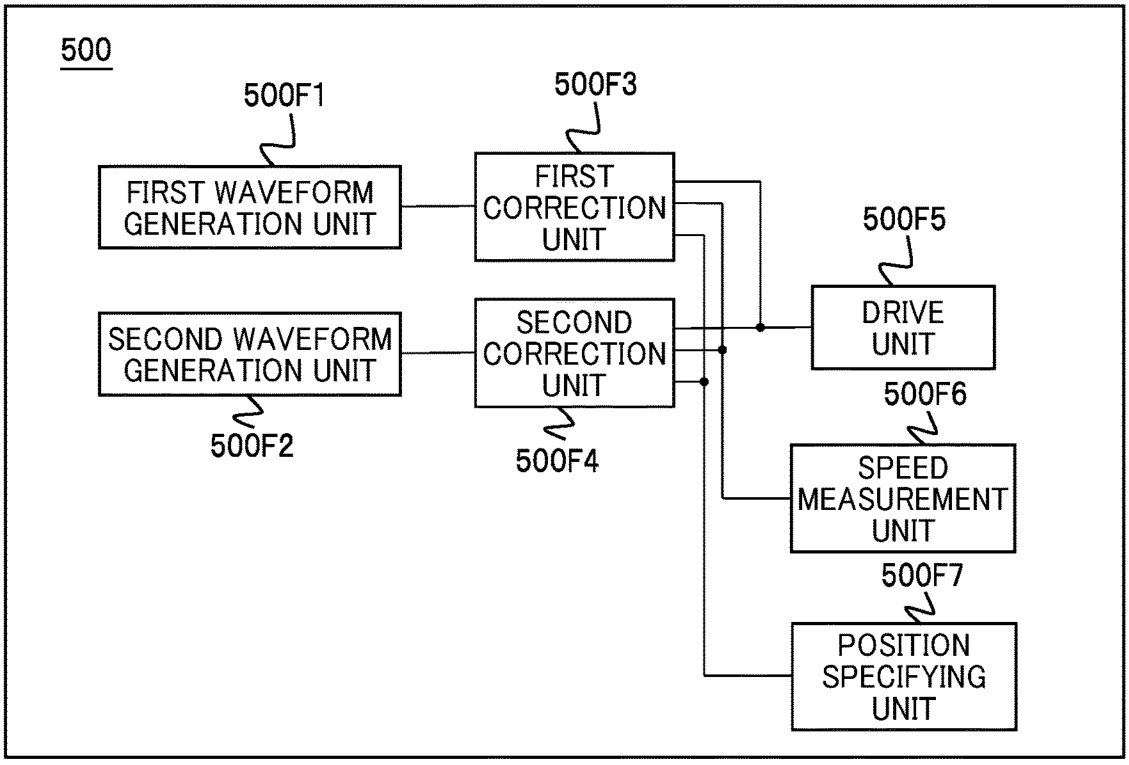
FIG. 15 is a diagram illustrating a functional configuration of a droplet discharge apparatus according to an embodiment of the present disclosure.

FIG. 15 is a diagram illustrating a functional configuration example of a droplet discharge apparatus 500 according to this embodiment. For example, the droplet discharge apparatus 500 has a functional configuration provided with a first waveform generation unit 500F1, a second waveform generation unit 500F2, a first correction unit 500F3, a second correction unit 500F4, a drive unit 500F5 and the like. As illustrated in the diagram, the droplet discharge apparatus 500 is desirably further provided with a speed measurement unit 500F6, a position specifying unit 500F7 and the like.

The first waveform generation unit 500F1 generates a first waveform in a case of discharging a first droplet type out of a plurality of droplet types. For example, the first waveform generation unit 500F1 is implemented by the first analog circuit 1721 and the like.

The second waveform generation unit 500F2 generates a second waveform in a case of discharging a second droplet type out of the plurality of droplet types. For example, the second waveform generation unit 500F2 is implemented by the second analog circuit 1722 and the like.

The first correction unit 500F3 corrects the first waveform at first correction magnification to generate a first correction waveform. For example, the first correction unit 500F3 is implemented by the first analog circuit 1721 and the like.

The second correction unit 500F4 corrects the second waveform at second correction magnification to generate a second correction waveform. For example, the second correction unit 500F4 is implemented by the second analog circuit 1722 and the like.

The drive unit 500F5 discharges a droplet according to a drive waveform. For example, the drive unit 500F5 is implemented by the switching circuit 242, the piezoelectric element 30 and the like.

The speed measurement unit 500F6 measures a droplet speed for each droplet type. The first correction unit 500F3 and the second correction unit 500F4 determine individual correction magnification for each droplet type based on a measurement result.

The position specifying unit 500F7 specifies a landing position for each droplet type. The first correction unit 500F3 and the second correction unit 500F4 determine the individual correction magnification for each droplet type so as to reduce a difference between the landing position and a target point for each droplet type based on the difference between the landing position and the target point.

The first waveform generation unit 500F1 and the second waveform generation unit 500F2 are an example of a plurality of waveform generation units that individually generates the drive waveform used when discharging each droplet type.

The first correction unit 500F3 and the second correction unit 500F4 are an example of a plurality of correction units that individually corrects each drive waveform using the different correction magnification corresponding to each of the drive waveforms generated by a plurality of waveform generation units, respectively, to generate the correction waveform.

In the configuration described above, it is possible to individually perform the correction for each droplet type in a case of using a plurality of droplet types. In particular, as illustrated in FIG. 3, the configuration in which the first waveform and the second waveform are generated by different circuits is desirable. In such circuit configuration, it becomes easy to perform different corrections for the respective droplet types.

Other Embodiments

The droplet type is, for example, a large droplet, a small droplet and the like. In this manner, the droplet type is classified by an amount, a size or the like of the droplet. The droplet type is not limited to a case of being classified into the large droplet and small droplet. For example, the droplet type may be classified into three or more stages. The droplet type may also be classified according to a material contained in the droplet, a color, an environment in which this is used or the like.

The droplet discharge apparatus is not limited to a method using the piezoelectric element as in the example described above. That is, as long as the droplet discharge apparatus controls the discharge of the droplet based on the drive waveform, the method may be another method such as a thermal method.

The droplet discharge apparatus may be, for example, a commercial printer (for example, a large electrophotographic printer, an inkjet printer or the like) and the like.

The recording medium is, for example, paper (also referred to as "standard paper" and the like). Note that the recording medium may also be an overhead projector sheet, a film, a flexible thin plate or the like in addition to coated paper, label paper and the like other than paper.

That is, a material of the recording medium may be any material as long as the ink droplet may be attached, may be temporarily attached, may be attached and fixed, or may be attached and permeated.

Specifically, the recording medium is a recorded medium such as paper, a film, or cloth, an electronic component such as an electronic board and a piezoelectric element (also referred to as a "piezoelectric member" and the like), a powder layer (also referred to as a "powder layer" and the like), an organ model, an inspection cell or the like.

In this manner, the material of the recording medium may be paper, thread, fiber, cloth, leather, metal, plastic, glass, wood, ceramics, or a combination thereof to which the droplet may attach.

Note that embodiments of the present disclosure are not limited to the above-described embodiments, and various modifications may be made without departing from the technical gist thereof, and all technical matters included in the technical idea recited in claims are the subject of the present disclosure. It is therefore to be understood that the disclosure of the present specification may be practiced otherwise by those skilled in the art than as specifically described herein. Such embodiments and variations thereof are included in the scope and gist of the embodiments of the present disclosure and are included in the embodiments described in claims and the equivalent scope thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A droplet discharge apparatus comprising:
- a discharge device configured to discharge droplets of a plurality of droplet types according to a plurality of drive waveforms;
- a plurality of waveform generation units configured to individually generate drive waveforms used to discharge each of the plurality of droplet types;
- a plurality of correction units configured to individually correct the drive waveforms generated by each of the plurality of waveform generation units, using correction magnifications different corresponding to the drive waveforms generated by the plurality of waveform generation units, to generate correction waveforms;
- a drive unit configured to cause the discharge device to discharge the droplets according to corrected drive waveforms generated by individually switching the drive waveform corresponding to the plurality of droplet types to the correction waveforms; and
- a speed measurement unit configured to measure a speed of a droplet for each of the plurality of droplet types,
- wherein the plurality of correction units are configured determine a correction magnification for each of the plurality of droplet types and correct the speed based on a measurement result of the speed by the speed measurement unit.

2. The droplet discharge apparatus according to claim 1, further comprising a position specifying unit configured to specify, for each of the plurality of droplet types, a landing position at which a droplet lands on a recording medium,
- wherein the plurality of correction units are configured to determine a correction magnification to decrease a difference between the landing position and a target point for each of the plurality of droplet types, based on the difference between the landing position and the target point.

3. The droplet discharge apparatus according to claim 1, wherein the drive unit further includes:
- a switching circuit configured to switch the correction waveforms to obtain a corrected drive waveform; and
- a piezoelectric element configured to displace according to a voltage of the corrected drive waveform, and
- wherein the voltage is adjustable according to a correction magnification.

4. The droplet discharge apparatus according to claim 1, wherein the plurality of waveform generation units includes a plurality of different circuits configured to generate the drive waveforms.

5. The droplet discharge apparatus according to claim 1, wherein the discharge device is an inkjet discharge device configured to discharge ink droplets to form an image on a recording medium.

6. A droplet discharge apparatus comprising:

a discharge device configured to discharge droplets of a plurality of droplet types;

a first waveform generation unit configured to generate a first waveform to discharge a first droplet type of the plurality of droplet types;

a second waveform generation unit configured to generate a second waveform to discharge a second droplet type of the plurality of droplet types;

a first correction unit configured to correct the first waveform at a first correction magnification to generate a first correction waveform;

a second correction unit configured to correct the second waveform at a second correction magnification to generate a second correction waveform;

a drive unit configured to cause the discharge device to discharge the droplets according to corrected drive waveforms obtained as a result of switching the first correction waveform and the second correction waveform; and a speed measurement unit configured to measure a speed of a droplet for each of the plurality of droplet types, wherein the first correction unit is configured to determine the first correction magnification for the first droplet type and correct the speed of the first droplet type based on a measurement result of the speed by the speed measurement unit;

wherein the second correction unit is configured to determine the second correction magnification for the second droplet type and correct the speed of the second droplet type based on the measurement result of the speed by the speed measurement unit.

7. A droplet discharge apparatus comprising:

a discharge device configured to discharge droplets of a plurality of droplet types;

a first circuit configured to:

generate a first waveform to discharge a first droplet type of the plurality of droplet types; and correct the first waveform at a first correction magnification to generate a first correction waveform;

a second circuit configured to:

generate a second waveform to discharge a second droplet type of the plurality of droplet types; and correct the second waveform at a second correction magnification to generate a second correction waveform;

a third circuit configured to cause the discharge device to discharge the droplets according to corrected drive waveforms obtained as a result of switching the first correction waveform and the second correction waveform; and a speed measurement unit configured to measure a speed of a droplet for each of the plurality of droplet types, wherein the first circuit is configured to determine the first correction magnification for the first droplet type and correct the speed of the first droplet type based on a measurement result of the speed by the speed measurement unit;

wherein the second circuit is configured to determine the second correction magnification for the second droplet type and correct the speed of the second droplet type based on the measurement result of the speed by the speed measurement unit.

* * * * *